United States Patent
Lissianski et al.

(10) Patent No.: US 6,895,875 B1
(45) Date of Patent: May 24, 2005

(54) MERCURY REDUCTION SYSTEM AND METHOD IN COMBUSTION FLUE GAS USING STAGING

(75) Inventors: Vitali Victor Lissianski, San Juan Capistrano, CA (US); Peter Martin Maly, Lake Forest, CA (US); William Randall Seeker, San Clemente, CA (US); Roy Payne, Mission Vierjo, CA (US); Vladimir M. Zamansky, Oceanside, CA (US); Loc Ho, Sparks, NV (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 10/714,939

(22) Filed: Nov. 18, 2003

(51) Int. Cl.$^7$ ............................................. F23J 15/00
(52) U.S. Cl. ........................ 110/345; 110/344; 423/210
(58) Field of Search ........................ 110/342, 344, 345, 110/347, 264; 95/134; 423/210

(56) References Cited

U.S. PATENT DOCUMENTS

| | | | |
|---|---|---|---|
| 4,196,173 A | 4/1980 | deJong et al. | |
| 4,233,274 A | 11/1980 | Allgulin | |
| 4,273,747 A | 6/1981 | Rasmussen | |
| 4,814,152 A | 3/1989 | Yan | |
| 4,843,102 A | 6/1989 | Horton | |
| 5,141,724 A | 8/1992 | Audeh et al. | |
| 5,315,939 A * | 5/1994 | Rini et al. | 110/264 |
| 5,320,051 A * | 6/1994 | Nehls, Jr. | 110/345 |
| 5,409,522 A | 4/1995 | Durham et al. | |
| 5,413,477 A | 5/1995 | Moreland | |
| 5,572,938 A | 11/1996 | Leger | |
| 5,695,726 A | 12/1997 | Lerner | |
| 5,787,823 A | 8/1998 | Knowles | |
| 6,027,551 A | 2/2000 | Hwang et al. | |
| 6,058,855 A * | 5/2000 | Ake et al. | 110/214 |
| 6,206,685 B1 | 3/2001 | Zamansky et al. | |
| 6,280,695 B1 | 8/2001 | Lissianski et al. | |
| 6,451,094 B1 | 9/2002 | Chang et al. | |
| 6,471,506 B1 | 10/2002 | Zamansky et al. | |
| 6,521,021 B1 * | 2/2003 | Pennline et al. | 95/134 |
| 6,558,454 B1 | 5/2003 | Chang et al. | |
| 6,595,147 B2 | 7/2003 | Teller et al. | |
| 6,604,474 B2 | 8/2003 | Zamansky et al. | |
| 6,719,828 B1 | 4/2004 | Lovell et al. | |
| 2001/0041157 A1 | 11/2001 | Spokoyny | |
| 2002/0029690 A1 | 3/2002 | Ridgeway et al. | |
| 2002/0095866 A1 | 7/2002 | Hassett | |
| 2002/0102189 A1 | 8/2002 | Madden et al. | |
| 2002/0166484 A1 | 11/2002 | Zamansky et al. | |
| 2002/0170431 A1 | 11/2002 | Chang et al. | |

(Continued)

OTHER PUBLICATIONS

"Kinetic Models For Predicting the Behavior Of Mercury In Coal-Fired Power Plants", C. Senior, et al., ACERC Annual Conference, Feb. 19-20, 2003, pp. 1-22.

(Continued)

Primary Examiner—Kenneth Rinehart
(74) Attorney, Agent, or Firm—Nixon & Vanderhye, P.C.

(57) ABSTRACT

A method to reduce mercury in gas emissions from the combustion of coal is disclosed. Mercury emissions can be reduced by staging combustion process and/or reducing boiler excess oxygen. Fly ash formed under combustion staging conditions is more reactive towards mercury than fly ash formed under typical combustion conditions. Reducing boiler excess oxygen can also improve ability of fly ash to adsorb mercury.

7 Claims, 4 Drawing Sheets

U.S. PATENT DOCUMENTS

| | | |
|---|---|---|
| 2003/0005634 A1 | 1/2003 | Calderon et al. |
| 2003/0009932 A1 | 1/2003 | Kobayashi et al. |
| 2003/0079606 A1 | 5/2003 | Katz |
| 2003/0091490 A1 | 5/2003 | Nolan et al. |
| 2003/0091948 A1 | 5/2003 | Bool, III et al. |
| 2003/0099912 A1 | 5/2003 | Kobayashi et al. |
| 2003/0099913 A1 | 5/2003 | Kobayashi et al. |
| 2003/0104328 A1 | 6/2003 | Kobayashi et al. |
| 2003/0104937 A1 | 6/2003 | Sinha |
| 2003/0108470 A1 | 6/2003 | Spencer et al. |
| 2003/0108833 A1 | 6/2003 | Kobayashi et al. |
| 2003/0110994 A1 | 6/2003 | Lissianski et al. |
| 2003/0143128 A1 | 7/2003 | Lanier et al. |
| 2003/0147793 A1 | 8/2003 | Breen et al. |
| 2003/0154858 A1 | 8/2003 | Kleut et al. |
| 2003/0185718 A1 | 10/2003 | Sellakumar |
| 2004/0011057 A1 | 1/2004 | Huber |

OTHER PUBLICATIONS

"Evaluating The Effects of Low-NOx Retrofits on Carbon In Ash Levels[1]", K.A. Davis, et al. Presented at the Mega Symposium: EPRI-DOE-EPA Combined Utility Air Pollutant Control Symposium, Atlanta, GA, Aug. 1999, pp. 1-15.

"Behavior of Mercury In Air Pollution Control Devices on Coal-Fired Utility Boilers[1]" Constance L. Senior, Prepared For Power Production in the 21st Century: Impacts of Fuel Quality and Operations, Engineering Foundation Conference, Snowbird, UT, Oct. 28-Nov. 2, 2001, pp. 1-17.

"Loss On Ignition In Coal Combustion Simulations", Stefan P. Domino et al., pp. 1-49 (1999).

Reaction Engineering International brochure "Furnace Performance", Reaction Engineering International, printed from REI website on Aug. 22, 2003, pp. 1-2.

"Comparison of Photoacoustic Methods To Loss-On-Ignition and Foam Index Tests In Fly Ash Evaluations", Robert Novack, et al., pp. 1-2 (1997).

"Combustion Optimization Using MPV Systems", Mark Khesin, et al., Pittsburgh Coal Conference, Sep. 2000, pp. 1-4.

"Reburn Systems", GE Power Systems, Air Quality Systems & Services, pp. 1-3, GEA-13207 (2001).

"FlamemastEER™ Low $No_x$ Burners", GEA-13132, p. 1, printed Dec. 2003.

"$NO_x$ Control for Gas Turbines", GE Power Systems, pp. 1-2, printed Dec. 17, 2003.

"$NO_x$ Control for Boilers", GE Power Systems, pp. 1-2, printed Dec. 17, 2003.

"Coalogic™", GE Power Systems, pp. 1-2, printed Dec. 17, 2003.

"Coal Balancing & Blending", GE Power Systems, pp. 1-2, printed Dec. 17, 2003.

"$NO_x$ Reduction", Hamon, pp. 1-2, Dec. 8, 2003.

"Selective Catalytic Reduction (SCR)", Hamon, pp. 1-2, printed Dec. 8, 2003.

"Selective Non-Catalytic Reduction (SNCR)", Hamon, pp. 1-3, printed Dec. 8, 2003.

"SCR SNCR Hybrid System", Hamon, pp. 1-2, Dec. 8, 2003.

"Evaluation of the Effect of SCR NOx Control Technology on Mercury Speciation", Feeley, III et al., Mar. 2003, pp. 1-11.

John H. Pavlish et al., "Status Review Of Mercury Control Options For Coal-Fired Power Plants", pp. 89-165, Fuel Processing Technology 82 (2003).

Thomas D. Brown et al., "Mercury Measurement And Its Control: What We Know, Have Learned, and Need To Further Investigate", Journal of the Air & Waste Management Association, pp. 628-640, vol. 49, Jun. 1999.

Blair A. Folsum et al, "Combustion Modification—An Economic Alternative for Boiler $NO_x$ Control", GE Power Systems, GER-4192, pp. 1-8, Apr. 2001.

R. Sehgal et al., "Intelligent Optimization of Coal Burning to Meet Demanding Power Loads, Emission Requirements, and Cost Objectives", GE Power Systems, GER-4198, pp. 1-14, Oct. 2000.

The Washington Post, "Limiting Mercury Pollution Is Focus of Hot Debate", pp. A3, Mar. 15, 2004.

\* cited by examiner

MERCURY REDUCTION SYSTEM AND METHOD IN COMBUSTION FLUE GAS USING STAGING

BACKGROUND OF THE INVENTION

This invention relates to the combustion of coal and in particular to the reduction of mercury (Hg) in flue gases generated during coal combustion.

Mercury is a constituent part of coal mineral matter. Mercury volatizes during coal combustion as elemental mercury ($Hg^0$). Mercury that remains as elemental mercury through the furnace tends to remain in the flue gas. It is desirable to lower the amount of mercury released in flue gases during coal combustion.

Oxidized mercury is more easily collected by emission control devices than is elemental mercury. Oxidization of mercury in flue gases is a known technique to capture mercury and remove it from flue gases. As flue gases cool, mercury is partially oxidized by chlorine which is present in coal and is released during combustion. It is believed that most oxidized mercury ($Hg^{+2}$) in flue gas is present as mercury chloride ($HgCl_2$). Oxidation of mercury occurs in combustion gas-phase reactions and on the surface of fly ash. It is believed that mercury oxidation on the surface of fly ash is a predominant channel of mercury oxidation.

Oxidized mercury ($HgCl_2$ or $Hg^{+2}$) is water soluble and is easily adsorbed on high carbon fly ash or activated carbon. The mercury captured by fly ash may be collected with the ash and removed via a particulate collection system. Oxidized mercury is also easily removed by wet scrubbers that are used to control sulfur dioxide ($SO_2$) emissions. Mercury control is generally most effective when the mercury in flue gas is mostly oxidized.

Bituminous coals typically have high chlorine content which improves mercury oxidation. In addition, fly ash of bituminous has a relatively high carbon content which promotes good mercury oxidation. In contrast, low rank coals have a relatively low chlorine content and have a high reactivity that results in low carbon content in fly ash. Accordingly, elemental mercury from the combustion of low rank coals oxidizes to a lesser extent than does mercury from the combustion of bituminous or other high chlorine coals.

SUMMARY OF THE INVENTION

The invention may be embodied as a method to reduce mercury in gas emissions from the combustion of coal in a combustion unit including the steps of: combusting coal in a primary combustion zone of the combustion unit under conditions of low or no excess oxygen during combustion in the zone; generating carbon rich fly ash during combustion; releasing mercury during the combustion into flue gases generated by the combustion; staging combustion air by injecting combustion air in a post-combustion zone downstream of the combustion zone in the combustion unit; adsorbing the mercury in the flue gas with the fly ash, and collecting the fly ash with the adsorbed mercury in a combustion waste treatment system.

The invention may also be embodied as a method to reduce mercury in gas emissions from the combustion of coal in a combustion system, said method comprising: combusting the coal in a primary combustion zone of the combustion system, wherein elemental mercury ($Hg^0$) is released in the flue gas produced by the combustion; staging combustion air supplied to the combustion system by adding a portion of the combustion air to the primary combustion zone and a second portion of the combustion air to an overfire air zone downstream of the combustion zone; maintaining a level of excess oxygen in the primary combustion zone of no greater than 2 percent so as to release active carbon in the fly ash generated by the combustion of coal; oxidizing the elemental mercury by generating oxidized mercury ($Hg^{+2}$); adsorbing at least part of the oxidized mercury in the flue gas by the active carbon in the fly ash, and collecting the fly ash with adsorbed mercury in a combustion waste treatment system.

The invention may be further embodied as a system to treat mercury in flue gas emissions from a coal fired furnace comprising: a primary combustion zone receiving combustion air and having a downstream passage for flue gases and fly ash generated during combustion; a coal injector adapted to inject coal into the primary combustion zone; an air injector adapted to introduce combustion oxygen into the combustion zone, wherein an amount of excess oxygen in the zone is no greater than 2 percent so as to release active carbon in the fly ash generated by the combustion of coal; an overfire air burnout zone downstream of the combustion zone and included in the downstream passage, wherein combustion air is injected into the burnout zone; a combustion treatment waste system coupled to the flue gas output and a discharge for captured particulate waste, and wherein said primary combustion zone burns the coal such that the fly ash has active carbon to oxidize and adsorb the mercury released in the flue gas.

DETAILED DESCRIPTION OF THE INVENTION

Reactive fly ash formed in situ in the coal combustion process can be effective at reducing mercury (Hg) emissions from coal-fired power plants. Reactive fly ash can improve mercury oxidation through catalytic reactions on the surface of the fly ash. Oxidized mercury is easily adsorbed on carbon containing particles such as in-situ formed high carbon fly ash or activated carbon, or can be removed in wet scrubbers.

Although mercury oxidation on fly ash takes place in the post-combustion zone of a boiler, the reactivity of fly ash is affected by combustion conditions in the combustion zone of the boiler. In particular, it has been found that the reactivity of fly ash is influenced by the amount of excess air in the combustion zone.

A method has been developed for effective mercury control in a stationary coal-firing combustion systems by applying deeply staged combustion to generate highly reactive fly ash and by reducing boiler excess oxygen in the combustion zone of a boiler. The combustion air is staged such that some air is introduced downstream of the combustion zone and air introduced into the combustion zone is at or near stoichiometric conditions.

Staging and/or operating the combustion zone under reduced excess oxygen conditions, e.g., where the combustion is at or near stoichiometric conditions, increases the reactivity of fly ash in the flue gases. Fly ash formed under combustion staging conditions is more reactive with mercury than is fly ash formed under typical combustion conditions. Similarly, fly ash formed under reduced boiler excess air conditions adsorbs oxidized mercury more effectively that does fly ash generated from combustion with greater amounts of excess air.

Increasing the staging during combustion and/or reducing excess combustion air increases the portion of released mercury that is captured in the flue gas by making the fly ash more reactive. Under typical excess air combustion conditions, fly ash with low carbon content (less than 1%) is not an effective mercury sorbent in full-scale boilers. However, by increasing the staging of air and by reducing the amount of excess air in the combustion zone low carbon content carbon fly ash can be effective in improving mercury oxidation.

Fly ash formed under combustion staging conditions has a higher surface area than does fly ash formed under normal combustion air conditions. Fly ash with high surface area is more effective at mercury oxidation than is the relatively low surface area fly ash generated from combustion using conventional amounts of excess combustion air. Accordingly, increasing the degree of combustion staging can increase the capacity of fly ash to capture mercury.

Staged combustion diverts a portion of the combustion air from a primary combustion zone to a secondary zone, e.g., an overfire air (OFA) zone. Combustion modifications, such as, $NO_x$ control technology, can be made to existing boilers to utilize combustion staging to reduce $NO_x$ and mercury emissions. Deeper staging is traditionally applied to achieve more significant $NO_x$ control. Conventional optimum deep staging for effective $NO_x$ reduction may require different operating conditions than does the deep staging discussed here for effective mercury oxidation on fly ash.

During staged combustion, some carbon in coal does not burn out as completely as it would in a boiler environment with a high level of excess air in the combustion zone. Staged combustion tends to increase the level of unburned carbon in the fly ash, especially when bituminous coals are being burned. Increasing the unburned carbon in fly ash by under deeply staged combustion conditions improves mercury removal.

There is a relatively small increase in fly ash when staging low rank coals. The lack of a large increase in fly ash suggests that any increase in mercury adsorption on fly ash for the low rank coals may not be significant. Increasing the depth of combustion staging, e.g., the amount of oxygen introduced far downstream in the flue gases (such as at an OFA injector), improves mercury oxidation on the surface of fly ash of low rank coals even when staging does not increase significantly the amount of carbon in fly ash.

Fly ash formed during combustion of coal is more reactive towards mercury when boiler excess oxygen is reduced. The level of boiler excess air affects boiler $NO_x$ and CO emissions and typically is set to minimize these emissions and unburned carbon. This is achieved by adjusting air flow to the combustion zone and to the overfire air (OFA) zone.

It has been discovered that reducing the boiler excess air results in an increase in the efficiency of mercury removal by fly ash. Minimization of excess air ($O_2$) can be achieved by adjusting the air flow to the primary combustion, reburn and OFA zones. Excess air in the primary combustion zone may also be reduced by blocking leaks in the boiler back pass section. Reducing these air leaks should improve efficiency of mercury oxidation and adsorption on fly ash without affecting boiler $NO_x$ and CO emissions.

Reactive fly ash may have a composition of 1 to 30 percent (%) carbon by weight, and preferably 3 to 20% by weight. The combustion conditions in the boiler are modified to promote a higher amount of active carbon in the fly ash than would otherwise occur. By increasing fly ash reactivity, the efficiency of mercury removal by fly ash is improved. The combustion conditions are optimized by applying a deeply staged combustion process that generates reactive fly ash and by reducing excess air in the boiler. Reducing excess oxygen in a combustion process is complementary with low nitrogen oxide(s) (NOx) combustion control. Accordingly, mercury emissions may be reduced by operating at very low levels of excess oxygen and deeply staging, while also minimizing NO, emissions.

Figure 1:
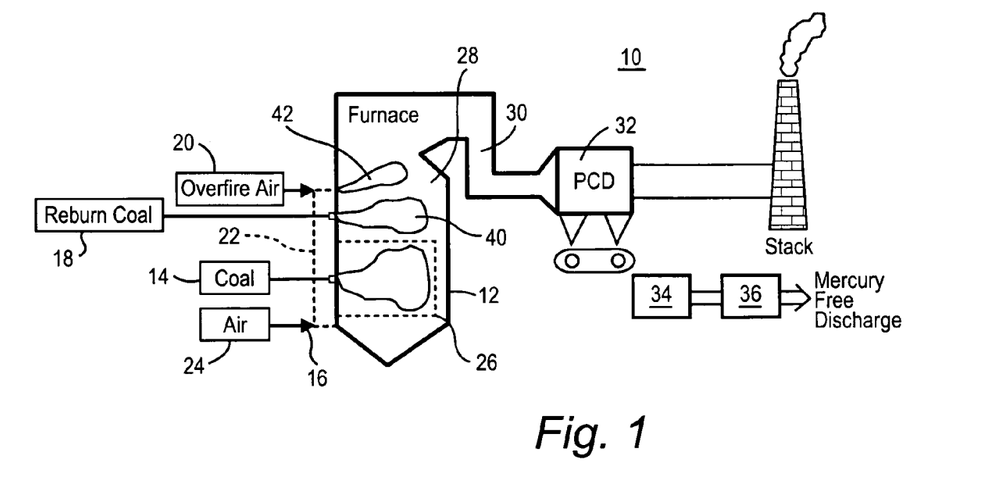
FIG. 1 is a schematic diagram of a coal fired power plant having a primary combustion zone with a low NOx burner (LNB), a coal reburn zone, and an overfire air (OFA) zone.

FIG. 1 shows a coal-fired power plant 10 comprising a coal combustion furnace 12, e.g., a boiler, having a coal fuel injection system 14, primary air injectors 16, reburn coal injectors 18 and overfire air (OFA) injectors 20. An exterior air duct 22 may distribute air provided by an air source 24, e.g., ambient air, to the primary combustion air injectors 16 and overfire air injectors 20. The coal injection system 14 and combustion air injectors 16 may be included in a low NOx burner (LNB) system.

The furnace 12 includes a combustion zone 26 and a post combustion zone 28, which includes a convective pass 30. The power plant 10 further includes a particulate control device (PCD) 32, ash burnout unit 34 and a mercury collection unit 36 comprising a bed of activated carbon or other reagent. Most of the coal is burned in a primary combustion zone 26 of the boiler 12. The remaining coal is injected downstream through reburn injectors 18 to provide a fuel-rich reburning zone 40. Overfire air is injected into a OFA burnout zone 42 to complete combustion.

Most mercury content of the coal is transferred to a flue gas phase during combustion in the primary combustion zone 26. In the reburning zone 40, carbon in the reburning coal does not burn out as completely as in a primary combustion zone that has excess air. Therefore, coal reburning increases the level of unburned carbon in the flue gas. By selecting coal type and specific conditions for injection of coal fuel and air, the combustion process can be controlled to produce a flue gas with increased carbon-containing active fly ash. The flue gas is cooled in the convective pass 30 where mercury is absorbed by the fly ash carbon. The fly ash with mercury is then collected in the PCD 32. Fly ash collected in the PCD 32 is treated in the ash treatment unit 36. Ash treatment unit can be a burnout unit or the like. If a burnout unit is used, then excess heat can be partially recovered, for example by the plant by preheating water used for boiler heat exchange. Mercury released from the fly ash carbon is absorbed by activated carbon as the ash burnout products pass through mercury collection unit 36.

The concentrations of nitrogen oxides, mercury, and carbon in fly ash are reduced by a three-step process. In the first step, the concentration of NOx is decreased in the fuel-rich zone of coal reburning (in other embodiments this step can be accomplished by LNB or by another fuel/air staging low NOx Combustion Modification technology). The combustion zone of the particular technology is controlled to form enhanced carbon in fly ash. The enhanced carbon in fly ash can be formed by optimizing the fuel staging and air staging conditions and combustion conditions, for example, by changing the amount of the reburning fuel, temperature of flue gas at the location of reburning fuel and/or OFA injection. Also, more active carbon in fly ash can be formed by selecting a coal type or coal particle size. Further, enhanced carbon can be controlled by adjusting LNB flow, by selecting a specific LNB design, by regulating excess air in the main combustion zone 26, adjusting the stoichiometric ratio of fuel and adjusting fuel/air mixing in primary 26 and secondary 28 combustion zones.

In the second step, the carbon-containing fly ash is cooled to below 450° F., and desirably to below 400° F. and preferably below 350° F. At these fly ash temperatures, NOx is further reduced in a reaction with carbon, and mercury is absorbed by the enhanced carbon in the fly ash. The PCD 32 can collect the ash with carbon and absorbed mercury.

In the third step, the carbon is burned out from the fly ash. At the same time, mercury is desorbed from fly ash and collected in an activated carbon bed or a bed of other reagents, for example, gold or other metals, that form amalgams. Carbon burnout reactors are designed for effective removal of carbon. The burnout reactor can be used in combination with a mercury capture reactor.

Since the stream of gas through the carbon burnout reactor is much smaller than the stream of flue gas, the amount of activated carbon needed to collect mercury can be about two orders of magnitude lower than the amount of injected activated carbon to accomplish the same result.

It is beneficial to use in-situ formed carbon, i.e., formed in the boiler, in fly ash for mercury removal. Enhanced carbon in fly ash can be produced in a matter of seconds at combustion temperatures in the combustion zone 26. Additionally, the cost of controlling conditions to optimize production of enhanced carbon in fly ash from a coal-fired boiler typically, on a mass basis, is much less than the cost of injected activated carbon. Since the carbon is produced "in situ," no extra costs are incurred in respect of handling of the activated carbon and delivering it to the boiler.

Flue gases, fly ash, unburned coal particles and other particulate material (collectively referred to as "combustion products") flow upwards through the furnace 12. In general, flue gas consists of fly ash and various gasses and volatile compounds, such as nitrogen, oxygen, carbon dioxide, nitrogen oxides, water, carbon monoxide, sulfur dioxide, and various acid gasses. The precise composition of the flue gas is determined by the nature of the process generating the flue gas and can vary significantly in time. Some combustion products fall to the bottom of the furnace and are discharged as waste.

Coal combustion in conventional coal-fired furnaces is usually not totally complete, and generates fly ash with some carbon content. Moreover, active carbon fly ash is generated during conventional low Nitrogen oxide($NO_x$) processes such as Low NOx Burner (LNB), in overfire air (OFA) injection, coal reburning and in connection with other conventional low NOx combustion technologies.

In the furnaces disclosed herein, the primary combustion zone 26 is configured such that carbon rich fly ash is formed by maintaining fuel-rich conditions. For example, the amount of excess air in the primary combustion zone 26 is less than two percent, and preferably 0.3 percent or less. The overfire air zone 42 is configured to operate fuel-lean. However, since temperature in the OFA zone is lower than that in the main combustion zone, the carbon in the fly ash in the flue gases does not completely burnout. Accordingly, the reactivity of the fly ash flowing downstream of the furnace and to the conductive pass 30 is greater than would otherwise be expected in an efficient coal-fired furnace.

The combustion is staged by applying coal reburn. Reburn is a two-stage fuel injection technology in which part of the coal fuel (usually 15–25% of the total furnace heat input) is diverted above the existing primary combustion zone 26 to a reburn zone 40 to produce a slightly fuel-rich environment in the reburn zone. A portion of the combustion air is diverted downstream of the reburn zone to the overfire air injectors 20 and the OFA burnout zone 42. Combustion occurs in the primary combustion zone 26, in the reburn zone 40 and is completed in the OFA zone 42. The efficiency of mercury removal by fly ash is increased by reducing excess air in the primary combustion zone 26. This is achieved by reducing the total amount of the combustion air, diverting more fuel to the reburn zone, and diverting more air into OFA zone, than would occur in a conventional furnace having a reburn zone and an OFA zone.

Figure 2:
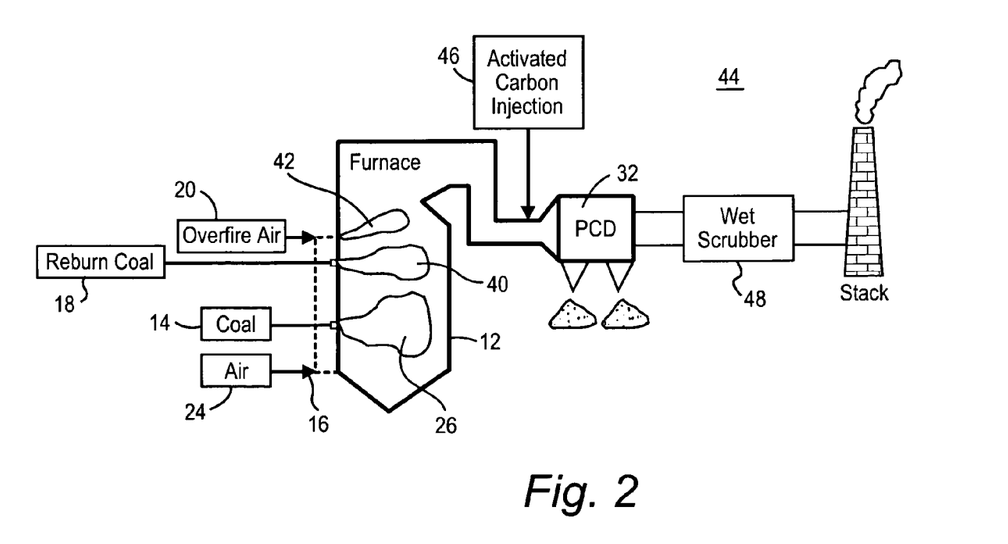
FIG. 2 is a schematic diagram of coal fired power plant similar to the plant shown in FIG. 1 and also an activated carbon injector and a wet scrubber.

FIG. 2 depicts a coal power plant 40 similar to the plant 10 shown in FIG. 1. The same reference numbers have been used to label the components of the coal power plant 44 shown in FIG. 2 that are the same as the components of the plant 10 shown in FIG. 1. The power plant 44 includes an activated carbon injection system 46 and a web scrubber 48.

The benefits and effectiveness of reducing excess oxygen to generate high carbon fly ash are evident from the following description of coal combustion tests. Tests were performed in a 1.0 MMBTU/hr Boiler Simulator Facility (BSF) 60. The BSF facility is shown schematically in FIG. 4. The BSF provides sub-scale simulation of the flue gas temperatures and compositions found in a full-scale boiler of a utility power plant.

Figure 3:
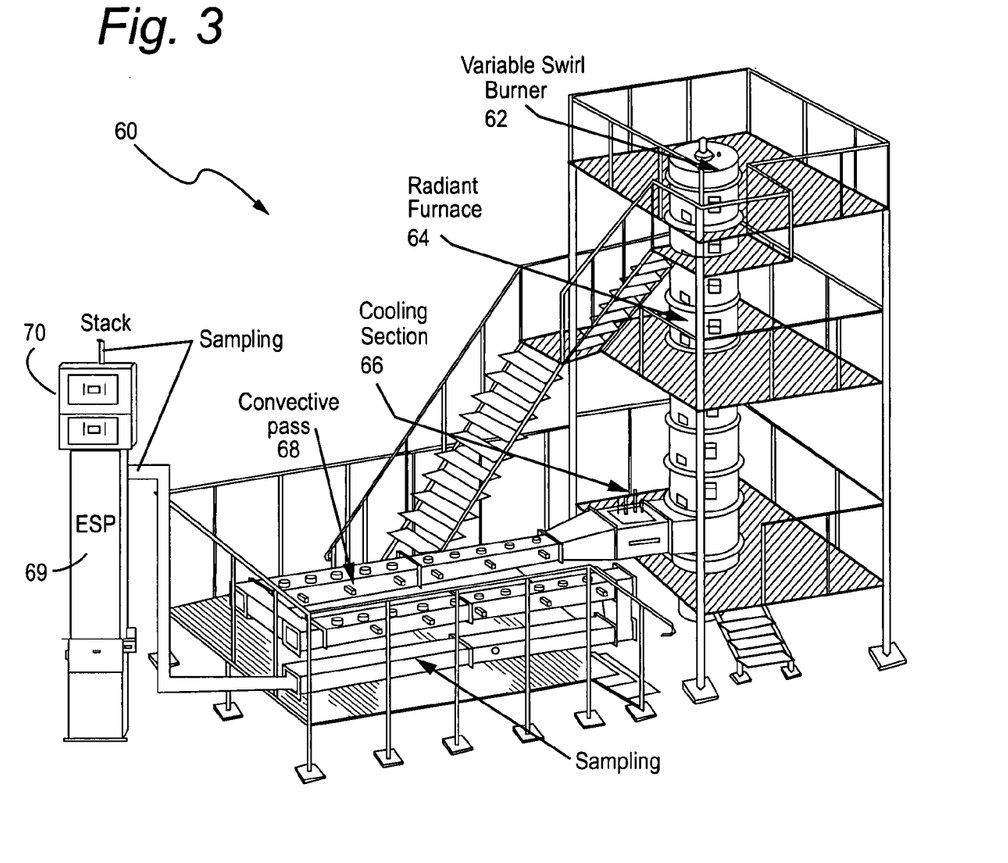
FIG. 3 illustrates a boiler simulation facility.

As shown in FIG. 3, the BSF 60 includes a burner 62, a vertically down-fired radiant furnace 64, a cooling section 66, a horizontal convective pass 68 extending from the furnace, an electrostatic precipitator (ESP) 69, and a stack 70 with flue gas sampling instruments in communication with the convective pass. The burner 62 is a variable swirl diffusion burner with an axial fuel injector. Primary air is injected axially into the combustion zone of the furnace. Secondary air is injected radially through swirl vanes (not shown) to provide controlled fuel/air mixing in the combustion zone. The swirl number can be controlled by adjusting the angle of the swirl vanes. Numerous ports located along the axis of the furnace allow access for supplementary equipment such as reburn injectors, additive injectors, overfire air injectors, and sampling probes.

The radiant furnace 64 has eight modular refractory lined sections with an inside diameter of 22 inches and a total height of 20 feet. The convective pass 68 is also refractory lined, and contains air cooled tube bundles to simulate the superheater and reheater sections of a utility boiler. Heat extraction in radiant furnace and convective pass can be controlled such that the residence time-temperature profile matches that of a typical full-scale boiler. A suction pyrometer (not shown) measures furnace gas temperatures.

The ESP 69 for the BSF is a single-field unit consisting of 12 tubes with axial corona electrodes. Mercury concentration was measured at the ESP outlet using an online Hg analyzer. The analyzer is capable of measuring both elemental ($Hg^0$) and total mercury in flue gas. Oxidized (Hg+2) mercury can de determined as a differences between total mercury and $Hg^0$. The average temperature across the ESP was 350° F.

Seven types of coals were tested: Western coal (#1—the reference numeral appears in FIGS. 6 to 8); and Eastern Bituminous coal (#2), three types of U.S. Powered River Basin Coal (PRB) (#3–#5), and two lignite coals (#6 and 7). The BSF was fired on coal, and the carbon in ash content (also characterized as LOI) was controlled by staging combustion air. The amount of unburned carbon (UBC) in the fly ash is indicated by the loss-on-ignition (LOI) value of the ash.

By air staging, part of the combustion air is diverted away from the primary combustion zone and injected downstream in the OFA zone. Combustion of fuel in the primary combustion zone 26 occurs in fuel-rich or near stoichiometric conditions as characterized by the air to fuel stoichiometric ratio ($SR_1$). Conditions after injection of overfire (OFA) are fuel-lean and characterized by the air to fuel stoichiometric ratio ($SR_2$) at the OFA zone.

By reducing the amount of oxygen, the primary combustion zone 26 operates under fuel rich conditions. At these fuel-rich conditions, the stoichiometric air-fuel ratio ($SR_1$) in the primary combustion zone is below, at or slightly above 1.0. At an $SR_1$ of 1.0, ideally all of the coal is burned in the primary combustion zone. In real-world conditions, some active carbon does not burn when the $SR_1$ is equal 1.0. Conventional furnaces generally operated where the $SR_1$ is above 1.1 in order to complete combustion.

Figure 4:
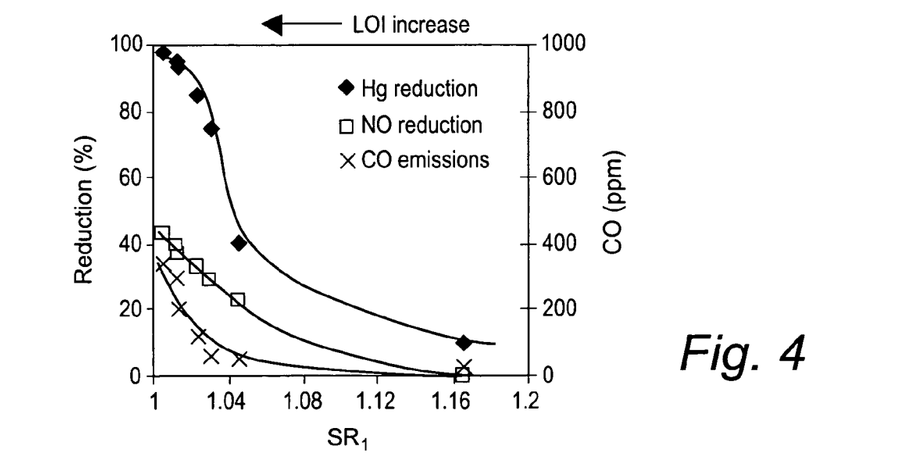
FIG. 4 is a chart of the effects of mercury, $NO_x$ and CO emissions with respect to the stoichiometric air to fuel ratio (SR1) in the primary combustion zone combusting a bituminous coal.

FIG. 4 presents a chart of the effect of excess oxygen on Hg and NOx reduction and carbon monoxide (CO) emissions for Bituminous coal #2. Pilot scale BSF tests demonstrated that reducing excess oxygen had a significant effect on NOx, LOI and mercury removal. Mercury removal was defined as a difference between total introduced mercury with fuel and the amount of mercury measured in the gas phase at the ESP 68 outlet. As the value of $SR_1$ decreased from 1.16 to 1.0, excess oxygen decreased from 2.7% to almost 0%. The amount of mercury and NOx emissions (left hand side of FIG. 4 chart) was reduced at low $SR_1$ values, e.g., below 1.05. However, at low $SR_1$ values, e.g. below 1.04, the amount of CO emissions (right hand side of chart) and LOI increased. The LOI of the fly ash also increased as the $SR_1$ value decreased.

FIG. 4 indicates that reducing excess oxygen ($O_2$) such that the $SR_1$ in the primary combustion zone is below 1.05 increases mercury removal by fly ash adsorption and PCD removal.

With deep staging, combustion air, e.g., 20% to 35%, was diverted to the OFA zone 26. To avoid excessive oxygen in the OFA zone, the stoichiometric air-fuel ratio ($SR_2$) for the OFA zone was controlled by metering the amount of overfire air. In one example, $SR_2$ was maintained at a value of 1.16. Maintaining the level of excess oxygen in the OFA zone to 0.4% and preferably to less than 0.2% was found to increase the amount of mercury removal.

Figure 5:
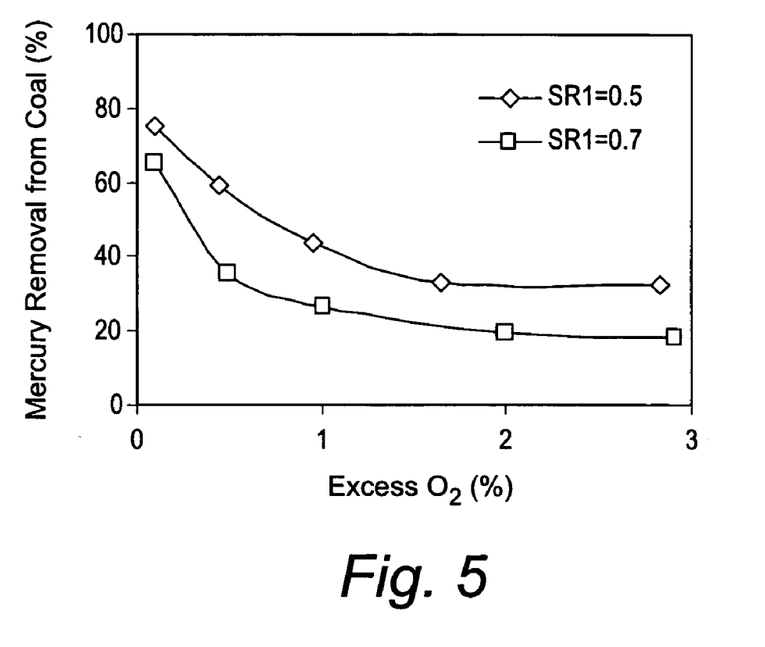
FIG. 5 is a chart of the effects of deep air staging on mercury removal where the staging was adjusted by varying $SR_2$ (OFA) for constant $SR_1$ values of 0.5 and 0.7.
Figure 6:
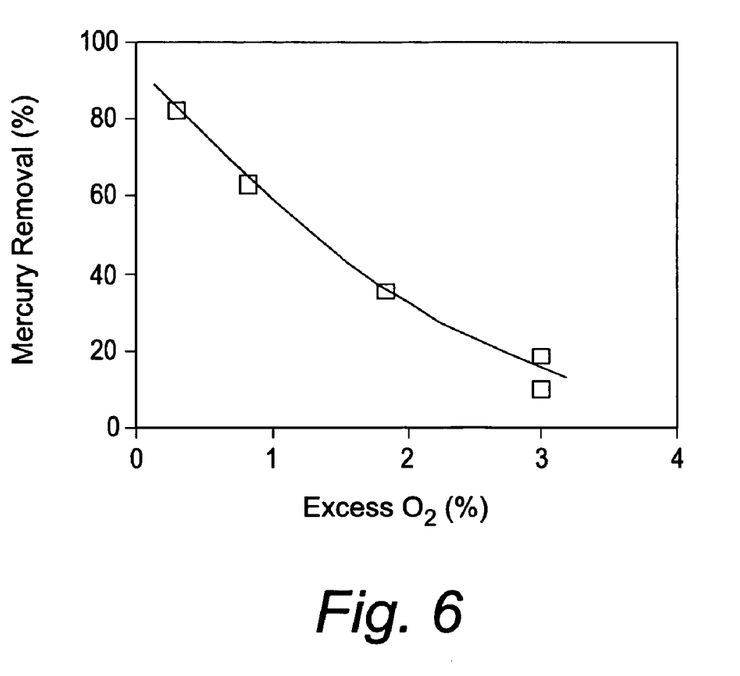
FIG. 6 is a chart of mercury removal with respect to loss of ignition (LOI) at levels of excess oxygen of 3% and below 0.5% for a constant $SR_1$ value of 0.5 and a PRB coal.

FIG. 5 shows the effect of reducing excess oxygen in the OFA zone on mercury removal for lignite coal #6 at $SR_1$ values of 0.5 and 0.7. FIG. 6 shows the effect of excess oxygen in the OFA zone on mercury removal for PRB coal combustion at an $SR_1$ of 0.5. Mercury removal increased as excess oxygen in the OFA zone decreased, and Hg removal approached 70% to 80% at values of excess oxygen in the range of 0.2% to 0.4%. The increase in mercury removal was substantial at very low excess oxygen levels, e.g., less than 1%, in the OFA zone. A 5% improvement in mercury removal efficiency was achieved as the excess oxygen levels in the OFA zone were reduced from 3% to 2%.

Figure 7:
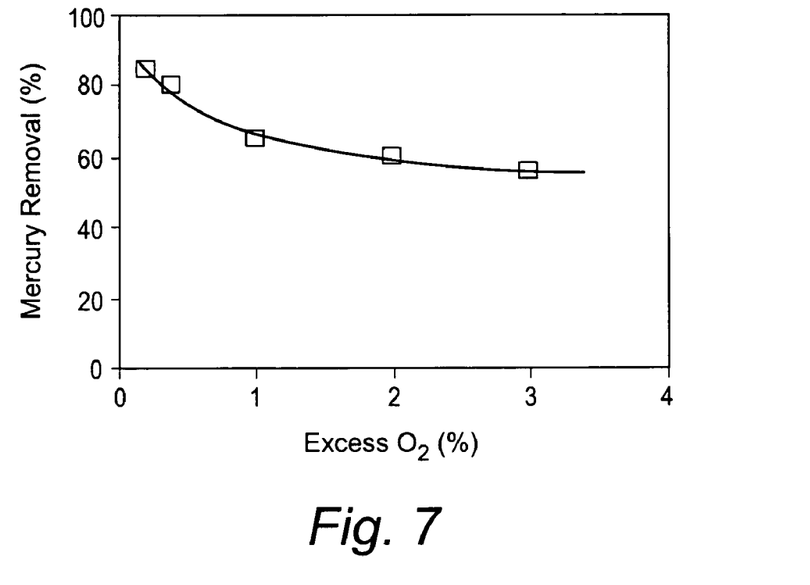
FIG. 7 shows the effect of excess oxygen ($O_2$) on Hg removal.

FIG. 7 is a chart that shows the effect of excess oxygen in the OFA zone on mercury removal for a coal blend of 70% PRB coal and 30% Western Bituminous coal. The mercury removal efficiency increased from 60% at excess oxygen levels of 3% to above 80% for low levels of excess oxygen, e.g., below 0.5%. FIG. 7 demonstrate that up to 90% mercury removal can be achieved for coal blends at excess oxygen of about 0.3%. FIG. 7 also demonstrates that about 10% improvement in mercury removal can be achieved by reducing excess $O_2$ from 3% to about 2%.

Figure 8:
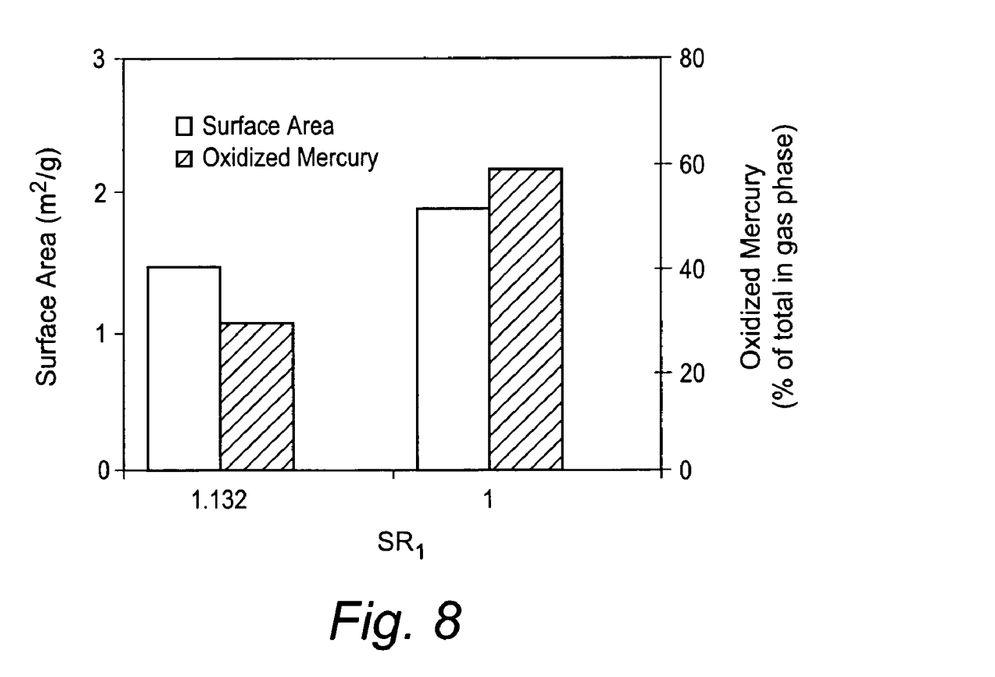
FIG. 8 is a chart of the effects of staging on fly ash surface area and the oxidation of mercury for $SR_1$ values of 1.132 and 1.0.

FIG. 8 shows surface area of fly ash and amount of oxidized mercury in flue gas at conventions combustion conditions and air staging. Conventional conditions (bars on the left hand side of FIG. 8) corresponded to $SR_1$= 1.132 and did not include staging. Air staging conditions (bars on the right hand side of FIG. 8) corresponded to $SR_1$=1.0 and $SR_2$=1.132. As shown in FIG. 8, the BSR pilot scale tests demonstrated that deep staging increased efficiency of mercury oxidation even when the amount of carbon in the fly ash did not increase due to deep staging. Testing PRB coal #5 demonstrated that because of high reactivity of this coal air staging had a small effect on carbon in fly ash content. Carbon in fly ash content at all staging conditions remained in the range of 0.3% to 0.4%.

Air staging, however, increased surface area of fly ash. Under deep staging conditions more elemental mercury was oxidized than under conventional combustion. FIG. 8 demonstrates that applying deep staging increased the percent of oxidized mercury in flue gas from about 30% to about 60% and increased fly ash surface area from 1.48 $m^2$/g (meters square to gram of fly ash) to 1.74 $m^2$/g. In summary, the BSR pilot-scale results show that deeper staging and very low excess $O_2$ improve efficiency of mercury removal by fly ash.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to reduce mercury in gas emissions from the combustion of coal in a combustion unit said method comprising:

a. combusting coal in a primary combustion zone of the combustion unit under conditions of low or no excess oxygen during combustion in the zone wherein the excess oxygen in the combustion zone is no greater than two percent (2%);

b. generating carbon rich fly ash during combustion and entraining the fly ash into flue as generated by the combustion;

c. releasing mercury during the combustion into the flue gases;

d. staging combustion air by injecting combustion air in a post-combustion zone downstream of the combustion zone in the combustion unit;

e. injecting coal into a reburn zone in the post-combustion zone and upstream of an overfire air burnout zone;

f. adsorbing the mercury in the flue gas with the fly ash;

g. collecting the fly ash with the adsorbed mercury in a combustion waste treatment system.

2. A method to reduce mercury in gas emissions from the combustion of coal in a combustion units said method comprising:
   a. combusting coal in a primary combustion zone of the combustion unit under conditions of low or no excess oxygen during combustion in the zone wherein the excess oxygen in the combustion zone is no greater than two percent (2%);
   b. generating carbon rich fly ash during combustion and entraining the fly ash into flue gas generated by the combustion;
   c. releasing mercury during the combustion into the flue gases;
   d. staging combustion air by injecting combustion air in a post-combustion zone downstream of the combustion zone in the combustion unit, wherein an amount of reburning fuel in the post-combustion zone is in a range of about 10 to about 30 percent of a total heat input of fuel used for the combustion of coal;
   e. adsorbing the mercury in the flue gas with the fly ash;
   f. collecting the fly ash with the adsorbed mercury in a combustion waste treatment system; and
   g. injecting activated carbon downstream of the post-combustion zone and upstream of the collection of fly ash.

3. A method to reduce mercury in gas emissions from the combustion of coal in a combustion unit said method comprising:
   a. combusting coal in a primary combustion zone of the combustion unit under conditions of low or no excess oxygen during combustion in the zone wherein the excess oxygen in the combustion zone is no greater than two percent (2%);
   b. generating carbon rich fly ash during combustion and entraining the fly ash into flue gas generated by the combustion;
   c. releasing mercury during the combustion into the flue gases;
   d. staging combustion air by injecting combustion air in a post-combustion zone downstream of the combustion zone in the combustion unit, wherein an amount of reburning fuel in the post-combustion zone is in a range of about 15 to about 25 percent of a total heat input of fuel used for the combustion of coal;
   e. adsorbing the mercury in the flue gas with the fly ash;
   f. collecting the fly ash with the adsorbed mercury in a combustion waste treatment system; and
   g. injecting activated carbon downstream of the post-combustion zone and upstream of the collection of fly ash.

4. A method to reduce mercury in gas emissions from the combustion of coal in a combustion system, said method comprising:
   a. combusting the coal in a primary combustion zone of the combustion system, wherein elemental mercury ($Hg^0$) is released in the flue gas produced by the combustion;
   b. staging combustion air supplied to the combustion system by adding a portion of the combustion air to the primary combustion zone and a second portion of the combustion air to an overfire air zone downstream of the combustion zone to generate excessive active carbon in the fly ash;
   c. maintaining a level of excess oxygen in the primary combustion zone of no greater than 1.0 percent so as to release active carbon in the fly ash generated by the combustion of coal;
   d. oxidizing the elemental mercury by generating oxidized mercury ($Hg^{+2}$);
   e. adsorbing the elemental mercury in the flue gas by the active carbon in the fly ash; and
   f. collecting the fly ash with adsorbed mercury in a combustion waste treatment system.

5. A method to reduce mercury in gas emissions from the combustion of coal in a combustion system, said method comprising:
   a. combusting the coal in a primary combustion zone of the combustion system, wherein elemental mercury ($Hg^0$) is released in the flue gas produced by the combustion;
   b. staging combustion air supplied to the combustion system by adding a portion of the combustion air to the primary combustion zone and a second portion of the combustion air to an overfire air zone downstream of the combustion zone;
   c. maintaining a level of excess oxygen in the primary combustion zone of no greater than 1.0 percent so as to release active carbon in the fly ash generated by the combustion of coal and entrained in flue gases from the combustion;
   d. oxidizing the elemental mercury by generating oxidized mercury ($Hg^{+2}$);
   e. reburning coal in the combustion system to generate additional active carbon in the fly ash generated during combustion;
   f. adsorbing the elemental mercury in the flue gas by the active carbon in the fly ash; and
   g. collecting the fly ash with adsorbed mercury in a combustion waste treatment system.

6. A method to reduce mercury in gas emissions from the combustion of coal in a combustion system, said method comprising:
   a. combusting the coal in a primary combustion zone of the combustion system, wherein elemental mercury ($Hg^0$) is released in the flue gas produced by the combustion;
   b. staging combustion air supplied to the combustion system by adding a portion of the combustion air to the primary combustion zone and a second portion of the combustion air to an overfire air zone downstream of the combustion zone;
   c. maintaining a level of excess oxygen in the primary combustion zone of no greater than 1.0 percent so as to release active carbon in the fly ash generated by the combustion of coal wherein a stoichiometric ratio (SR1) of the combustion of coal in a primary combustion zone of the combustion system is in a range of about 0.8 to about 1.05;
   d. oxidizing the elemental mercury by generating oxidized mercury ($Hg^{+2}$);
   e. adsorbing the elemental mercury in the flue gas by the active carbon in the fly ash;
   f. collecting the fly ash with adsorbed mercury in a combustion waste treatment system; and
   g. adding an amount of reburning fuel in a range of about 10 to about 30 percent of a total heat input of fuel used for the combustion of coal.

7. A method to reduce mercury in gas emissions from the combustion of coal in a combustion system, said method comprising:
   a. combusting the coal in a primary combustion zone of the combustion system, wherein elemental mercury ($Hg^0$) is released in the flue gas produced by the combustion;

b. staging combustion air supplied to the combustion system by adding a portion of the combustion air to the primary combustion zone and a second portion of the combustion air to an overfire air zone downstream of the combustion zone;

c. maintaining a level of excess oxygen in the primary combustion zone of no greater than 1.0 percent so as to release active carbon in the fly ash generated by the combustion of coal wherein a stoichiometric ratio (SR1) of the combustion of coal in a primary combustion zone of the combustion system is in a range of about 0.8 to about 1.05;

d. oxidizing the elemental mercury by generating oxidized mercury ($Hg+^2$);

e. adsorbing the elemental mercury in the flue gas by the active carbon in the fly ash;

f. collecting the fly ash with adsorbed mercury in a combustion waste treatment system; and g. adding an amount of reburning fuel is in a range of about 15 to about 25 percent of a total heat input of fuel used for the combustion of coal.

* * * * *